I. S. MERRELL.
CONDENSED BUTTERMILK, BUTTERMILK POWDER, AND PROCESS FOR MAKING SAME.
APPLICATION FILED APR. 8, 1916.
1,370,828.
Patented Mar. 8, 1921.
2 SHEETS—SHEET 1.
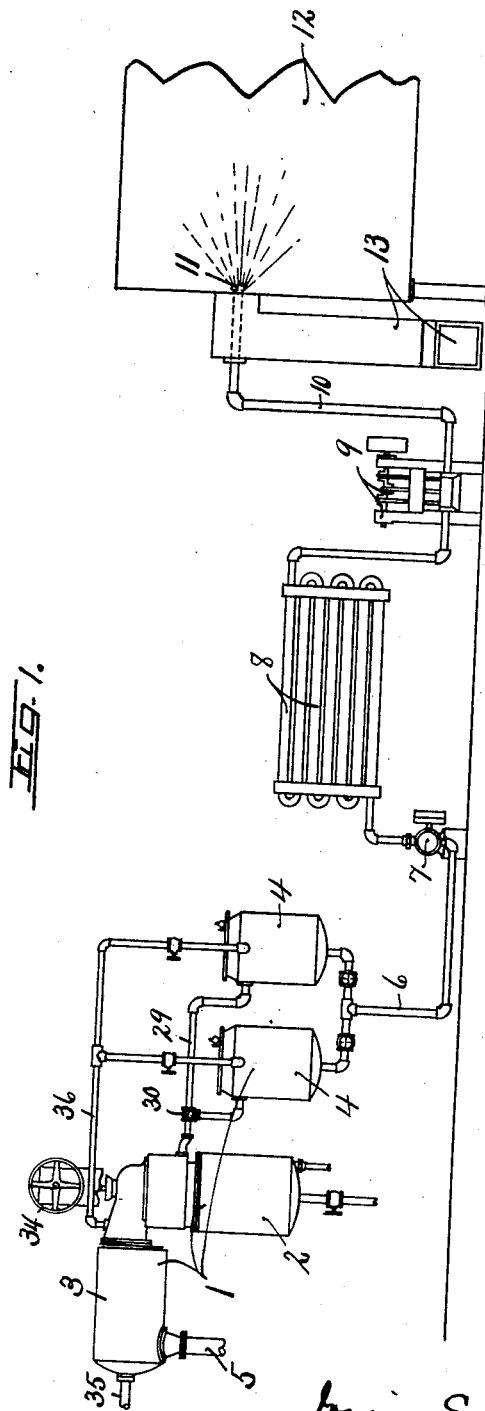

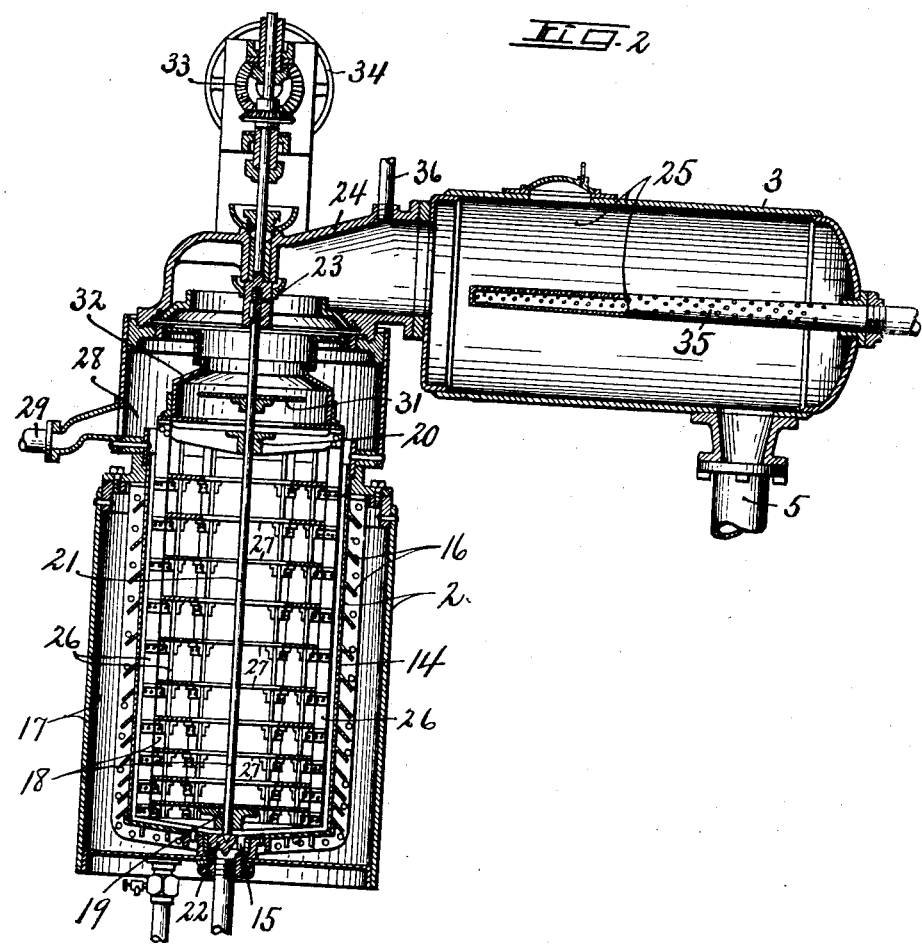

UNITED STATES PATENT OFFICE.

IRVING S. MERRELL, OF SYRACUSE, NEW YORK, ASSIGNOR TO MERRELL-SOULE COMPANY, OF SYRACUSE, NEW YORK, A CORPORATION OF NEW YORK.

CONDENSED BUTTERMILK, BUTTERMILK POWDER, AND PROCESS FOR MAKING SAME.

1,370,828.  Specification of Letters Patent.  Patented Mar. 8, 1921.

Application filed April 8, 1916. Serial No. 89,901.

*To all whom it may concern:*

Be it known that I, IRVING S. MERRELL, a citizen of the United States, and resident of Syracuse, in the county of Onondaga, in the State of New York, have invented new and useful Improvements in Condensed Buttermilk, Buttermilk Powder, and Processes for Making Same, of which the following, taken in connection with the accompanying drawings, is a full, clear, and exact description.

This invention relates to certain improvements in food products, and relates more particularly to the production of condensed buttermilk and buttermilk powder and to the processes utilized in producing the same respectively, the claims of this application being limited to the buttermilk powder aspect of the invention.

Although attempts have been made and experiments carried out by me for the production of condensed buttermilk, I have never heretofore been able to produce a condensed buttermilk in which there was not, during the condensation or immediately subsequent thereto, a separation of certain of the constituents of the buttermilk resulting, first in a flaky appearance in the product, and in a short time in the complete wheying off or separation of the coagulated proteids from the whey. So far as I am aware, condensed buttermilk has never been successfully produced, the period of condensation so increasing or allowing the increase of acidity as to render the proteids insoluble in the resultant product.

Attempts have likewise been made by me to produce a soluble buttermilk powder, both by the use of the hot roll process and by the use of the spraying process as first disclosed in Letters Patent No. 666,711 to Stauf. It is found that the drying of buttermilk, and even ordinary fresh milk, upon heated rolls destroys the solubility of the product. The process described by Stauf consisting in introducing the milk in the form of a fine spray or mist into moisture-absorbing air does not affect the solubility of powder produced from ordinary raw milk, but attempts to apply the Stauf process to buttermilk disclose the fact that the proteids of the milk are rendered insoluble during the drying operation, so that buttermilk reconstituted from buttermilk powder made in accordance with Stauf, and which is the only known method of producing a soluble milk powder, shows within thirty minutes distinct evidences of separation or wheying off.

I have now discovered a process for producing, and have produced, by the use of such process condensed buttermilk which does not have the flaky appearance of the product produced by the prior attempts, and in which the proteids have not been rendered insoluble and are not separated from the remaining constituents of the milk.

I have further discovered that by pre-condensing the buttermilk in accordance with my process and then drying the same by introducing the condensed buttermilk in the form of a fine spray or mist into moisture-absorbing air, a soluble buttermilk powder is obtained which, when reconstituted by the addition of water, will not whey off for a considerable period of time, not less than twenty-four hours. The reconstituted product is, therefore, an improvement upon ordinary raw fresh buttermilk which will whey off if left to stand for a period of time not to exceed two or three hours.

These two products are my inventions and the processes for producing said products are likewise my inventions.

In the drawings, I have disclosed somewhat diagrammatically a suitable apparatus for carrying out a satisfactory process for producing these new products.

Figure 1 is an elevation of the apparatus.

Fig. 2 is a vertical section of the liquid-condensing chamber and the vapor-condensing chamber of the condensing apparatus.

The apparatus is substantially the same as that disclosed in my copending applications, Serial Nos. 62,243 and 62,244, both filed under date of November 18, 1914, and comprises, as shown in Fig. 1, a condensing apparatus —1— consisting of a steam-jacketed liquid-condensing chamber —2—, a vapor-condensing chamber —3— connected thereto, and a series of milk-receiving tanks —4—, each connected to the chamber —2— for the passage of liquid to each or all of said tanks, and likewise connected to the vapor-condensing apparatus —3— for producing in each or all of said tanks the same degree of vacuum that exists in the chamber —3—, The pipe —5— is adapted to be connected to any suitable pump adapted to form a seal for the vapor-condensing chamber and not necessary to herein further illustrate or describe. The tanks —4— are each suitably and independently connected to a pipe —6— through which the milk may be drawn by a small pump —7— and forced into and through a heating apparatus —8—, of any known or desirable construction, from which the milk passes to a pressure pump —9— by means of which it is forced under high pressure through pipe —10— and atomizer —11— into a desiccating chamber —12—. Moisture-absorbing air in sufficient regulated volume is supplied through the air tube —13— which, in this instance, is shown as directing the air into the desiccating chamber in such a manner that it surrounds and envelops and carries forward the spray. Any suitable means, such as a screen, may be provided for separating the powder from the moisture-laden air.

The specific construction of the liquid-condensing chamber and the vapor-condensing chamber of the condensing apparatus is disclosed in Fig. 2. The liquid-condensing apparatus comprises a vertically arranged cylindrical chamber or heater —14— formed preferably of thin sheet metal, such as sheet tin, having a substantially closed bottom provided with a central opening —15— constituting an inlet for the milk.

The exterior surface of the chamber or heater —14— is preferably provided with a plurality of horizontally disposed circumferential drip rings —16—, preferably having their edges fluted, to discharge the condensation collecting upon the outer surface of the heater. This chamber or heater is surrounded by a suitable casing —17— forming a steam jacket into which steam may be introduced through the casing in any suitable and well-known manner.

Within the chamber —14— is positioned a rotary beater —18— formed of a pair of end castings —19— and —20— carried by a vertically arranged central shaft —21— having its lower end journaled in a spider —22— positioned in the opening —15— and its upper end removably journaled in a bearing —23— carried by the cap —24— of the vapor-condensing apparatus —25—.

Suitable vertical bars —26— are secured to the end castings —19— and —20— and these bars as shown carry a series of horizontally disposed ring-shaped disks —27— of a diameter but slightly less than the interior diameter of the heater —14—, whereby upon rapid rotation of the beater —18— the milk is caused to travel in a film up the wall of the chamber, the horizontally disposed ring-shaped disks constituting dams preventing the milk from flowing except in a substantially uniform layer of continuous exterior conformation.

The upper end of the chamber —14— is surrounded by a trough —28— from which the discharge pipe —29— leads to each of the tanks —4—, a suitable three-way valve —30— or other means being provided for controlling the flow of the milk into either or both of said tanks.

The upper portion of the beater is provided with a deflecting plate —31— and a deflecting hood —32—, all of which features form a portion of the invention claimed in my said copending application. The shaft —21—, and thereby the beater, may be driven in any suitable way, as by gearing —33— and pulley —34—, not necessary to herein further illustrate or describe.

The vapor-condensing chamber —25— is of the same form and operates upon the same principle as in my said copending application; the vapor issuing from the heater —14— is drawn into the vapor-condensing apparatus —25— where it comes in contact with a series of water sprays issuing from the pipe —35—, whereby the vapor is condensed to retain and increase the vacuum in the apparatus.

The tanks —4— are each connected to the cap —24— of the vapor-condensing apparatus by a pipe —36— by means of which vacuum may be produced in either one or both of said tanks so that the milk will freely flow from the liquid-condensing apparatus to either or both of said tanks, as it is desired.

The known commercial operation of condensing milk which I have found unsuccessful in the condensing of buttermilk is, of course, carried on by batches,—that is, a quantity of milk is forced into the vacuum pan, replenished as the operation continues and allowed to remain there subjected to the heat for two or three hours, and then drawn off and a second batch placed in the pan and boiled down in the same manner. Cool entering milk is continuously being mixed, and its temperature averaged with the heated condensed milk in the pan. These conditions not only injuriously affect the flavor and keeping qualities of all milk, but have, in practice, been found unsuccessful in operating upon buttermilk, doubtless by reason of the increase in the acid content thereof, rendering the proteids insoluble and causing a separation or wheying off in the product.

The process disclosed herein is a continuous one and involves a centrifugally produced flowing layer of milk moving over a heated surface in a high vacuum. By the "high vacuum" is intended a vacuum of upward of 18" of mercury, the vacuum used in practice being from 23" to 26" of mercury, corresponding to buttermilk vaporizing temperatures of 144° to 120° F. The centrifugal force constantly tends to arrange the heavier portions of the liquid against the hot wall or surface, but the heat lightens the liquid by producing vapor in it, and thus compels it to retreat from the wall to make place for the non-vaporized heavier portions, thus constantly arranging the light vapor containing liquid nearer the center of the chamber where its vapor may escape most readily, and constantly arranging the non-vaporized liquid nearest the heated surface where it receives the greatest heat.

By reason of this action, the material in contact with the heated surface is liquid until the instant of its displacement from contact with such surface. The moment it boils, it is immediately displaced by the heavier non-boiling liquid and moved inwardly, and the vapor, separated from the liquid by the centrifugal action of the beater, is discharged, while the liquid containing the solids is thrown back into the moving layer of milk.

This automatic action of the centrifugal force constantly moving the cooler portions of the liquid into contact with the heated wall and constantly withdrawing the boiling portion with its bubbles, eliminates scorching of the material which occurs when bubbles remain in contact with the heating surface.

During its passage through the chamber the layer of milk is held in contact with the heated surface and is uniformly subjected to the heat, whereby the evaporation and condensation is uniform and is effected during the relatively short period of time consumed by the passage of the milk through the chamber, approximately a minute and a quarter to condense skim milk 3 or 4 to 1 in an apparatus of predetermined size operated at predetermined beater speeds. When the mechanically forced flowing layer of milk reaches the vaporizing temperature, it is not cooled by, or its temperature averaged with, a constantly replenished adjacent body of milk of different temperature. All of the liquid passing through the chamber is continuously and uniformly subjected to contact with the heated wall and to the transfer of heat by the inwardly moving bubbles and is uniformly heated thereby, as distinguished from the known apparatus in which only a comparatively small portion of the liquid is directly heated by contact with the heating surface, the remaining portions being heated by contact with the adjacent heated milk.

The mechanical movement of the milk continues to subject it uniformly to the vaporizing temperature as the viscosity increases. The briefness of the time during which the milk is subjected to the vaporizing temperature and the uniformity of subjection to this temperature reduce to a minimum any change in the constituents, and the product produced will dissolve in water and will not whey off for a considerable period of time, even greater in extent than the period at which wheying off will occur in fresh buttermilk.

In like manner, if buttermilk condensed in the manner heretofore described is reduced to powder by the process herein described, or perhaps by other suitable processes, the resultant product is readily soluble and is an improvement upon fresh buttermilk so far as permanency is concerned, in that it will not whey off for a considerable period of time, perhaps twenty-four (24) hours, whereas fresh buttermilk will show marked indication of separation of the constituents within two or three hours.

Although I have described particular methods for producing the products herein disclosed, I do not desire to limit myself to any particular process or series of steps in the production of said products, as changes may be made in the details of the process, and perhaps methods discovered for otherwise producing the products.

What I claim is:—

1. The process of condensing buttermilk consisting in introducing the buttermilk into the bottom of a substantially vertically disposed heated cylinder, causing the buttermilk to flow spirally upwardly upon the interior surface of said cylinder, applying heat externally to the cylinder to vaporize a portion of the liquid constituents of the buttermilk within the cylinder, condensing the vapor to produce high vacuum in the cylinder, and discharging the finished product from the cylinder in substantially the same succession as it was introduced.

2. The process of condensing buttermilk, consisting in causing the liquid to flow spirally upon the interior surface of a heated cylinder under high vacuum.

3. The process of condensing buttermilk, consisting in causing the liquid to flow spirally upon the interior surface of a heated cylinder to vaporize a portion of the liquid constituents of the buttermilk, discharging the buttermilk from the cylinder separately from the vapor and condensing the vapor to produce high vacuum in the cylinder.

4. The method of producing a condensed buttermilk product consisting in introducing the buttermilk into a container of substantially circular cross section under high vacuum and heated to a temperature sufficient to vaporize liquid constituents of the buttermilk at the pressure maintained in said container, shaping the buttermilk in the form of a layer upon the surface of the container, rapidly moving the layer spirally over such surface, permitting the vapor to escape inwardly from the layer and freely from the container, and discharging the buttermilk from the container.

5. The method of producing a condensed buttermilk product consisting in introducing the buttermilk into a container of substantially circular cross section, heating the buttermilk in said container to a temperature sufficient to vaporize liquid constituents of the buttermilk at the pressure maintained in said container, shaping the buttermilk in a layer upon the interior surface of the container with an interior substantially unobstructed vapor zone, rapidly moving the layer spirally over the surface from the inlet toward the outlet from the container, permitting the vapor to escape inwardly from the layer and freely from the container, and condensing the vapor to produce high vacuum in the container.

6. The method of producing a condensed buttermilk product consisting in introducing the buttermilk into a vertically disposed container of substantially circular cross-section, heating the buttermilk in said container to a temperature sufficient to vaporize the liquid constituents of the buttermilk at the pressure maintained in said container, centrifugally shaping the buttermilk in a layer upon the interior surface of the container with an interior substantially unobstructed vapor zone, rapidly moving the layer spirally over the surface from the inlet toward the outlet from the container, permitting the vapor to escape inwardly from the layer and freely from the container, and condensing the vapor to produce high vacuum in the container.

7. The process of producing concentrated buttermilk consisting in continuously introducing buttermilk into one end of a container of substantially circular cross-section open at one end for the escape of vapor, permitting an amount of buttermilk to enter the container sufficient only to form a spreading upon the wall thereof, maintaining a high vacuum in the container, shaping the introduced buttermilk in the form of a layer upon the interior surface of the container moving the layer circularly over the surface of the container and simultaneously causing the layer of buttermilk to move from the receiving end of the container toward the opposite end, heating the layer of buttermilk, while moving, to a temperature sufficient to vaporize liquid constituents thereof at the maintained pressure and discharging the concentrated butermilk from the container when it reaches the end of the container opposite that at which it was introduced into the container and under a pressure approximating the pressure maintained in the container.

8. The process of producing concentrated buttermilk consisting in continuously introducing buttermilk into one end of a container of substantially circular cross section open at one end for the escape of vapor, permitting an amount of buttermilk to enter the container sufficient only to form a spreading upon the interior wall thereof, shaping the introduced buttermilk in the form of a layer upon the interior surface of the container, moving the layer circularly over the surface of the container and simultaneously causing the layer of buttermilk to move from the receiving end of the container toward the opposite end, heating the layer of buttermilk, while moving, to a temperature sufficient to vaporize liquid constituents thereof at the pressure maintained in the container, condensing the vapor to produce high vacuum in the container and discharging the concentrated buttermilk from the container when it reaches the end of the container opposite that at which it was introduced and under a pressure approximating the pressure maintained in the container.

9. The method of producing buttermilk powder consisting in introducing the buttermilk into a container of circular cross section under high vacuum and heated to a temperature sufficient to vaporize liquid constituents of the buttermilk at the pressure maintained in said container, shaping the milk in the form of a layer upon the surface of the container, rapidly moving the layer circularly over the surface and simultaneously causing the entire body of buttermilk to move from the point of introduction toward the opposite end of the container, permitting the vapor to escape inwardly from the layer and freely from the container, discharging the condensed buttermilk from the container, and desiccating the condensed buttermilk.

10. The method of producing buttermilk powder consisting in introducing the buttermilk into a container of circular cross section under high vacuum and heated to a temperature sufficient to vaporize liquid constituents of the buttermilk at the pressure maintained in said container, shaping the buttermilk in the form of a layer upon the surface of the container, rapidly moving the layer circularly over the surface and simultaneously causing the entire body of buttermilk to move from the point of introduction toward the opposite end of the container, permitting the vapor to escape inwardly from the layer and freely from the container, discharging the condensed buttermilk from the container, and atomizing the condensed buttermilk into moisture absorbing air to reduce it to a powder.

11. The method of producing buttermilk powder consisting in introducing the buttermilk into a container of circular cross section heated to a temperature sufficient to vaporize liquid constituents of the buttermilk at the pressure existing in said container, shaping the buttermilk in the form of a layer upon the surface of the container, rapidly moving the layer circularly over the surface and simultaneously causing the entire body of buttermilk to move from the point of introduction toward the opposite end of the container, permitting the vapor to escape inwardly from the layer and freely from the container, condensing the vapor to produce high vacuum in the container, discharging the condensed buttermilk from the container, and desiccating the condensed buttermilk.

12. The method of producing buttermilk powder consisting in introducing the buttermilk into a container of circular cross section heated to a temperature sufficient to vaporize liquid constituents of the buttermilk at the pressure existing in said container, shaping the buttermilk in the form of a layer upon the surface of the container, rapidly moving the layer circularly over the surface and simultaneously causing the entire body of buttermilk to move from the point of introduction toward the opposite end of the container, permitting the vapor to escape inwardly from the layer and freely from the container, condensing the vapor to produce high vacuum in the container, discharging the condensed buttermilk from the container, and atomizing the condensed buttermilk into moisture absorbing air to reduce it to a powder.

13. The process of producing buttermilk powder consisting in introducing the buttermilk into a container of substantially circular cross section under high vacuum and heated to a temperature sufficient to vaporize liquid constituents of the buttermilk at the pressure maintained in the container, shaping the buttermilk upon the interior surface of said container in the form of a tubular layer open at one end and closed at its opposite end, rapidly moving the layer spirally over the surface of the container, permitting the vapor to escape inwardly from the layer and freely from the container, discharging the condensed buttermilk at the open end of the tubular layer and atomizing the condensed buttermilk into a current of moisture-absorbing air whereby it is practically instantaneously reduced to dry powder.

14. The process of producing buttermilk powder consisting in introducing buttermilk into one end of a container heated to a temperature sufficient to vaporize liquid constituents of the buttermilk at pressure maintained in the container, maintaining a high vacuum in the container, positively moving the buttermilk circularly over the surface of the container, permitting an amount of substance to enter the container sufficient only to form a spreading on the heated wall of the container, causing the substance to move rapidly over the heated wall and to escape continuously from the container as soon as it reaches the end of the container opposite that at which it was introduced, and atomizing the concentrated buttermilk into moisture-absorbing air whereby it is practically instantaneously reduced to a dry powder.

15. The process of producing buttermilk powder consisting in continuously introducing buttermilk into one end of a container of substantially circular cross section open at one end for the escape of vapor, permitting an amount of buttermilk to enter the container sufficient only to form a spreading upon the wall thereof, maintaining a high vacuum in the container, shaping the introduced buttermilk in the form of a layer upon the interior surface of the container, moving the layer circularly over the surface of the container and simultaneously causing the layer of buttermilk to move from the receiving end of the container toward the opposite end, heating the layer of buttermilk, while moving, to a temperature sufficient to vaporize liquid constituents thereof at the maintained pressure, discharging the concentrated buttermilk from the container when it reaches the end of the container opposite that at which it was introduced into the container and under a pressure approximating the pressure maintained in the container, and atomizing the concentrated buttermilk so discharged into a current of moisture absorbing air to reduce it to a powder.

16. The process of producing buttermilk powder consisting in continuously introducing buttermilk into one end of a container of substantially circular cross section open at one end for the escape of vapor, permitting an amount of buttermilk to enter the container sufficient only to form a spreading upon the interior wall thereof, shaping the introduced buttermilk in the form of a layer upon the interior surface of the container, moving the layer circularly over the surface of the container and simultaneously causing the layer of buttermilk to move from the receiving end of the container toward the opposite end, heating the layer of buttermilk while moving to a temperature sufficient to vaporize liquid constituents thereof at the pressure maintained in the container, condensing the vapor to produce high vacuum in the container, discharging the concentrated buttermilk from the container when it reaches the end of the container opposite that at which it was introduced and under a pressure approximating the pressure maintained in the container, atomizing the concentrated buttermilk so discharged into a current of moisture absorbing air to reduce it to a powder.

In witness whereof I have hereunto set my hand this 5th day of April, 1916.

IRVING S. MERRELL.

Witnesses:
E. A. THOMPSON,
M. V. HOWLAND.